United States Patent [19]

Dawson

[11] 3,896,954

[45] July 29, 1975

[54] METHOD OF HANDLING LOOSE GLASS PLATES

[75] Inventor: Boyd S. Dawson, Cumberland, Md.

[73] Assignee: PPG Industries, Inc., Pittsburgh, Pa.

[22] Filed: Jan. 18, 1974

[21] Appl. No.: 434,480

Related U.S. Application Data

[62] Division of Ser. No. 289,205, Sept. 14, 1972, Pat. No. 3,838,779.

[52] U.S. Cl. .............................................. 214/152
[51] Int. Cl. ........................................... B65g 57/28
[58] Field of Search.......... 214/1 R, 1 S, 1 SW, 1 H, 214/1 Q, 1 QE, 7, 1 D, 152; 294/67 R, 67 A, 67 AA, 67 AB, 67 B, 74, 67 BB, 67 BC; 280/62, 79

[56] References Cited
UNITED STATES PATENTS

| | | | |
|---|---|---|---|
| 1,840,972 | 1/1932 | Raymond | 214/7 |
| 2,717,801 | 9/1955 | Neil | 214/16 B X |
| 3,343,862 | 9/1967 | Holmes | 294/74 |
| 3,410,425 | 11/1968 | Guillaume | 214/7 |

*Primary Examiner*—Frank E. Werner
*Attorney, Agent, or Firm*—Donald Carl Lepiane

[57] ABSTRACT

A method and apparatus for transporting loose packs of plate glass is disclosed. The transporter apparatus comprises a flat lattice-type horizontal frame structure adapted to receive stacks of plate glass. The frame is provided with a tricycle type wheel arrangement, with two of the wheels being fixed and one being a swivel caster. A towing tongue and lifting yoke assembly is provided at one end of the frame, by means of which the transporter may be towed or lifted into a vertical position by means of a hoist. At the opposite end of the frame the wheel housings for the two fixed wheels provide pivot edges onto which the frame is pivoted when it is being lifted into the vertical position. Connected to the frame at suitable locations are adjustable supports which hold the glass in position as the transporter is being towed or is being picked up.

Glass plates from a plate producing line are stacked on the transporter frame while it is in a horizontal position to form packs of desired thickness, and the transporter is towed to a storage area. A hoist then picks up the transporter by means of the lift yoke, pivoting the glass pack to a vertical position, and carries the transporter to a storage rack, to which the glass is transferred. When the glass pack is to be removed from the storage rack, a sling assembly is looped around the pack and it is picked up by means of a crane and carried to a suitable vehicle such as a truck or railroad car where it is again stacked on a storage frame for delivery to a customer.

8 Claims, 12 Drawing Figures

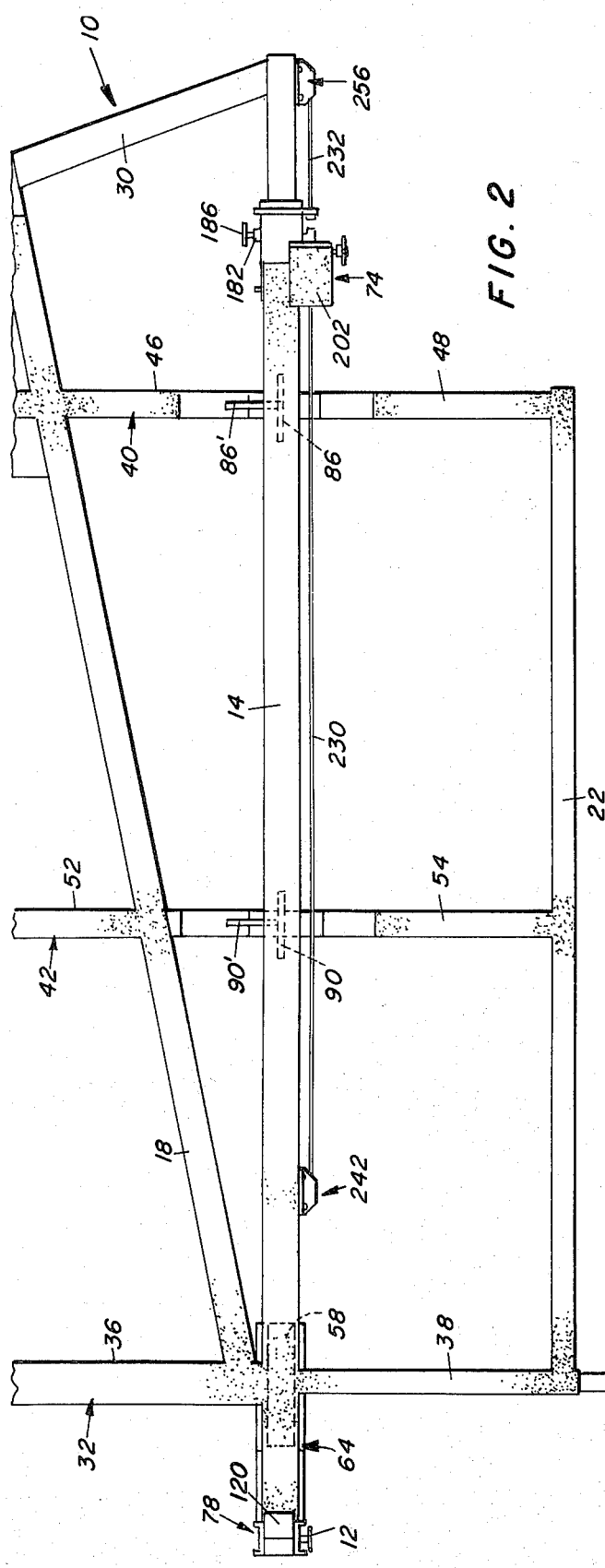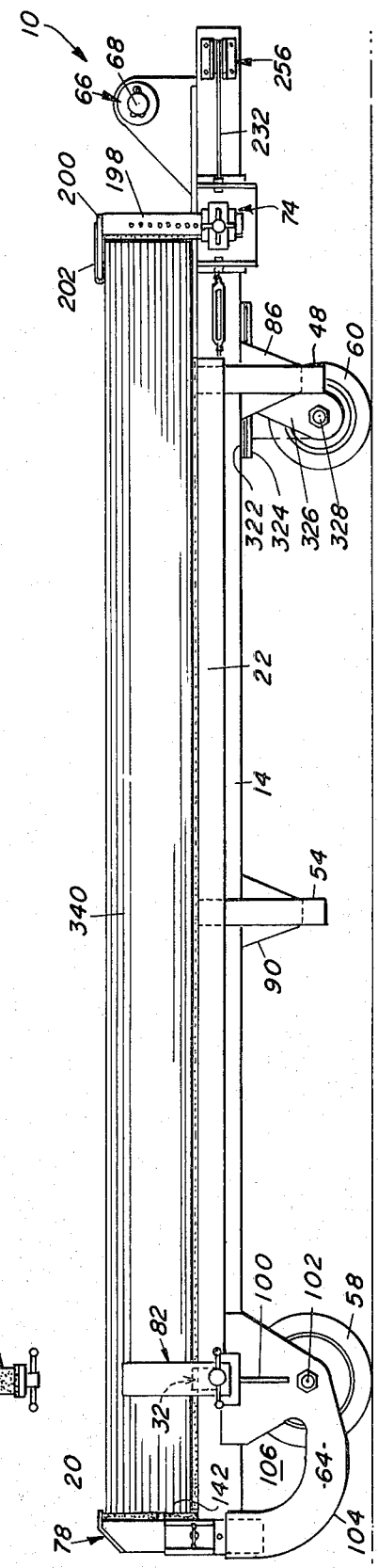

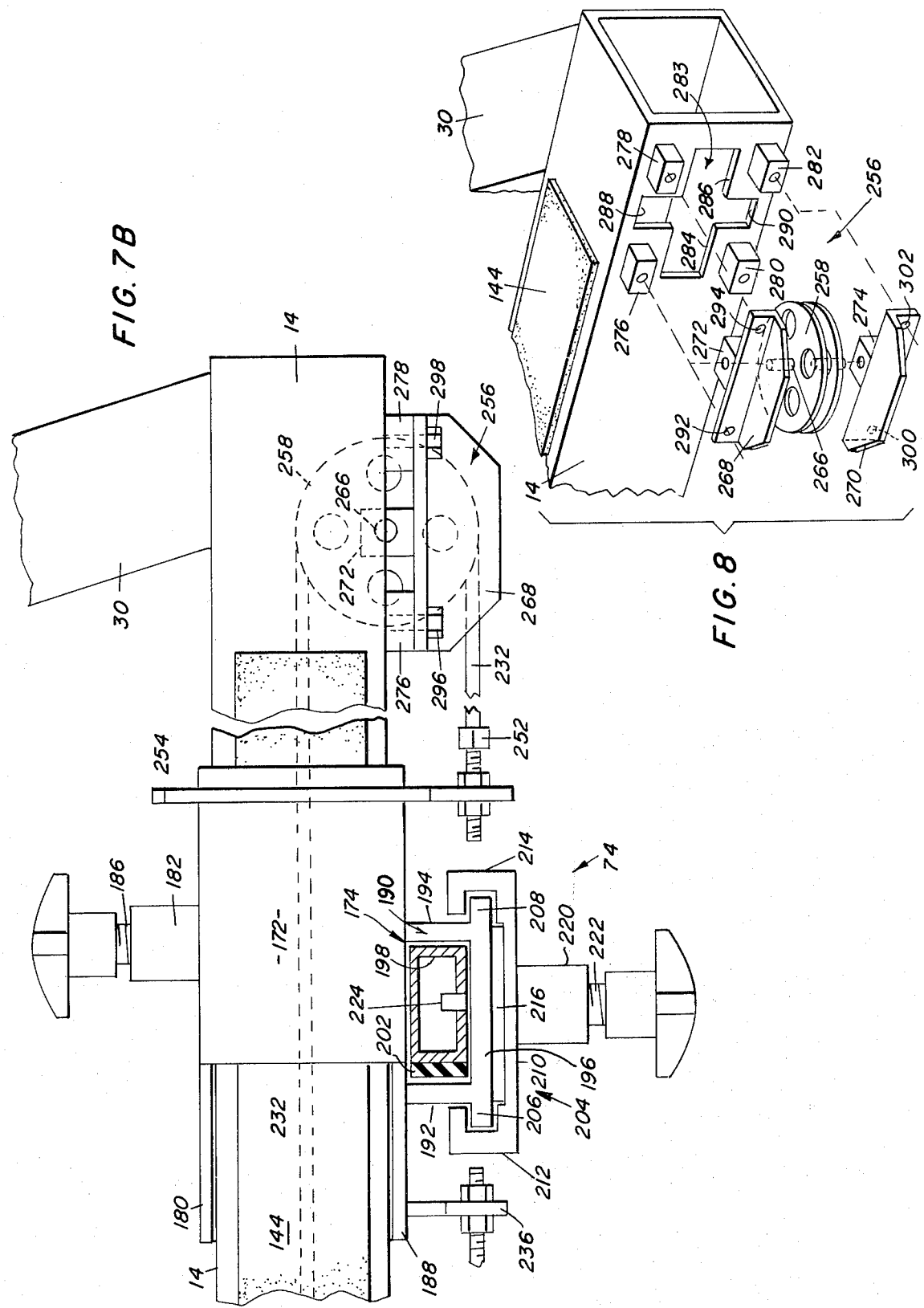

METHOD OF HANDLING LOOSE GLASS PLATES

This is a division of application Ser. No. 289,205, filed on Sept. 14, 1972, now U.S. Pat. No. 3,838,779.

BACKGROUND OF THE DISCLOSURE

The present invention relates, in general, to a method of handling glass packs and to apparatus for transporting plate glass. More particularly, the invention is directed to a transporter apparatus which is designed to receive plates of glass which are stacked to form a pack. The pack is then transported to a storage area where the glass is transferred first to a storage rack and subsequently to a suitable vehicle for delivery to a customer.

In the manufacture of plate glass, the completed glass sheet is cut into plates of selected size and the resultant plates carried by a suitable conveyor line to a wareroom for storage until such time as they are needed to fill an order from a customer. The glass is stored in packs, each pack comprising a plurality of sheets of a given size, with the packs varying in size over a wide range. Typically, the glass plates may be as small as 42 × 72 inches and may be as large as 120 × 156 inches, with the thickness of the packs in which the glass plates are stacked varying from 8 inches for the smaller plates to 3 inches for the larger sizes. Thus, the thickness of the pack will depend on the height and width dimensions of the plates so that the weight of the pack will not exceed the allowable carrying capacity of the equipment used in handling the glass.

The packs of glass are made up as the plates are taken off the cutting line of the conveyor, with the packs being stored in the wareroom until they are to be delivered to a customer. In the past, these packs have been formed in large boxes or crates which are fabricated and brought to the end of the cutting line. The cut plates are then lifted one at a time from the conveyor, for example, by a suitable suction lifting apparatus carried by an overhead crane, and set down in the packing crate. When the crate is full, it is sealed and carried away by a lift fork, a crane, or the like, to a selected storage area in the wareroom. When the glass pack is to be delivered to a customer, the crate is picked up and carried to a suitable storage rack on a railroad car or a delivery truck for shipment.

The use of packing crates for storing and shipping glass in this manner has been found to be unsatisfactory for a number of reasons. The use of such packing containers is expensive, both for the manufacturer and for the customer, for not only does the manufacturer have to purchase the packaging materials, but it must also assemble the boxes, pack them and seal them with sufficient protection that they can be handled without the risk of breaking the glass. This is time-consuming, and requires the use of additional personnel. Furthermore, the customer, upon receipt of the crated glass packs must uncrate the glass before it can be used and is then faced with the problem of disposing of the lumber, the metal straps and the other materials from which the packing crates are manufactured.

Accordingly, it has been found to be desirable from both the point of view of the manufacturer and of the glass plate user to store and transport glass packs without packaging the glass in bulky, difficult to handle and expensive packing crates. However, the problem of handling and delivering to a customer packs of glass plates that have not been secured in a container of some type presents a difficult problem, since the glass itself is not only bulky, but also very heavy and easily damaged, and for this reason the use of packing containers has been continued. But because many customers prefer to receive glass in an unpackaged form, it has become necessary for manufacturers to devise efficient equipment and methods of stacking, storing and handling such glass packs.

Since space is at a premium near a glass cutting line, the equipment used for handling the glass must be compact and maneuverable. The equipment must also be capable of shifting the glass from the horizontal position in which it is delivered by the cutting line conveyor to the vertical condition in which it is to be stored. Finally, the equipment must be sufficiently inexpensive that the overall cost of handling the glass in this manner is not any greater than the previous packaging methods, and preferably effects a savings.

A possible solution to the problem is the installation of a tilt table at the end of the cutting line conveyor. The glass would be stacked on a table and tilted up to the vertical position, where it could be removed from the table and transferred to a storage rack. However, tilt tables are excessively expensive, and it would be necessary to install such a table at the end of each cutting line in a manufacturing operation, since they are not portable. Further, space limitations may in some cases make a tilt table undesirable or unusable, and the extra handling required for such an operation would increase the possibility that the glass plates may be damaged.

SUMMARY OF THE INVENTION

Accordingly, it is an object of the present invention to provide an apparatus for receiving glass from a conveyor line and transporting it to a storage area, the apparatus being easily maneuverable and thus useable in confined areas, its use involving a minimum amount of handling unpackaged glass plates, which is relatively inexpensive, and which is easily portable for use with one or more conveyor lines.

It is another object of the present invention to provide a method and apparatus for handling unpackaged packs of glass plates for storage and shipping.

It is a further object of the present invention to provide a method of stacking glass plates to form loose packs of various sizes to transport the packs so formed to a storage facility.

It is another object of the present invention to provide an apparatus for forming packs of glass and for transporting such packs to storage, the apparatus providing quick and easy storage of glass plates with a minimum risk of damage to the glass. The apparatus eliminates the handling problems of prior methods and reduces substantially the cost of such handling through the elimination of the packing containers formerly thought to be essential.

Another object of the invention is to reduce the cost of handling glass plates by eliminating the difficulties inherent in packaging and unpackaging heavy plates.

Briefly, the transporter device of the present invention comprises a wheeled frame which functions as a packing container, as a horizontal glass support during loading and towing operations, and as a vertical lift device for placing packs of glass in a storage system when the transporter is hoisted. Two adjustable feet are attached at the base of the main frame members to position the glass on the frame when it is in the horizontal, or loading, position, and to support the glass when the frame is in the vertical, or carrying, position. Each foot is constructed to telescope into a housing so that it may be adjusted to the thickness of the pack. The support frame is carried by two fixed wheels and one swivel caster which permits easy maneuvering of the vehicle. Each fixed wheel is located in a wheel housing at the rearward end of the frame, the housing being formed to serve as a pivot when the transporter is raised to the vertical position. The pivot portion of the wheel housing takes the load off of the wheels when the frame reaches an angle of 12° above the horizontal, and provides a smooth transition of the weight from the wheels to the frame.

A lifting yoke and towing tongue assembly is attached to the frame just forward of the swivel caster, this assembly adapting the transporter for either vertical lifting by means of a hoist, such as a crane hook, or for horizontal towing by a suitable towing vehicle. A pair of finger guard assemblies are mounted on the main frame members and are slidable along the length of the frame to adjust to the height dimensions of the glass plates. A guard plate is vertically adjustable, attached to each sliding finger guard assembly and is held in place on the assembly by an adjustable clamp which allows the guard plate to be adjusted to accomodate the thickness of the glass pack. Each finger guard assembly is connected to a balance weight located inside the frame by means of a cable and pulley arrangement, at least one run of the cable extending outside the frame member on which it is mounted for use in adjusting the longitudinal position of the finger assembly.

A side stop is provided on each side of the frame for preventing transverse movement of the glass pack and for centering the pack on the transporter during loading operations.

Glass packs are formed by stacking a plurality of glass plates of a selected size on a transporter located, for example, at the end of a conveyor line leading from a glass cutting station. One of the side stops on the transporter is adjusted so that it functions with the adjustable feet to center the glass on the transporter and insure that succeeding plates are aligned with each other. Upon completion of the loading operation, the other side stop is moved against the edge of the pack and the two finger guard assemblies are moved into place and locked. The transporter may then be towed away from the loading area to a storage area. In the storage operation, a crane hook is secured to the lifting yoke on the front end of the transporter, the pack fingers are loosened for easy removal from the edge of the pack but left in place against the edge of the pack, and the side stops are released and pulled away from the pack to minimize strain on the pack ends. The transporter is then lifted by the crane into a vertical unloading position, the frame pivoting up onto the pivot housings, and then, when vertical, being lifted into the air for movement to a selected storage site. The frame is then positioned adjacent a storage rack of conventional design, the frame is lowered so that the glass rests on the storage rack, the finger guard assemblies are moved away from the edge of the glass, and the transporter removed, leaving the pack on the storage frame.

When the glass pack is to be removed from the storage frame, it is fitted with a sling assembly so that the pack may be picked up by a crane and carried to a delivery vehicle such as a truck or railroad car. The glass packs thus are delivered to the customers in an unboxed condition and are ready for use without the need for uncrating and disposing of the packaging materials.

BRIEF DESCRIPTION OF THE DRAWINGS

The foregoing and additional objects, features and advantages of the present invention will best be understood and appreciated from the following detailed description of a preferred embodiment thereof, selected for purposes of illustration and shown in the accompanying drawings, in which:

FIG. 2 is a top plan view of a portion of the transporter of FIG. 1;

FIG. 3 is a side elevation of the transporter of FIG. 1, illustrating the manner in which the glass plates of various sizes may be accomodated;

FIGS. 7A and 7B illustrate in top plan view and partial section, one of the main longitudinal frame elements of the transporter with its associated finger guard assembly;

FIG. 8 is an exploded view of the typical pulley assembly for the finger guard assembly;

FIG. 9 is an exploded perspective view of the lifting yoke and towing tongue assembly;

DESCRIPTION OF A PREFERRED EMBODIMENT

Figure 1:
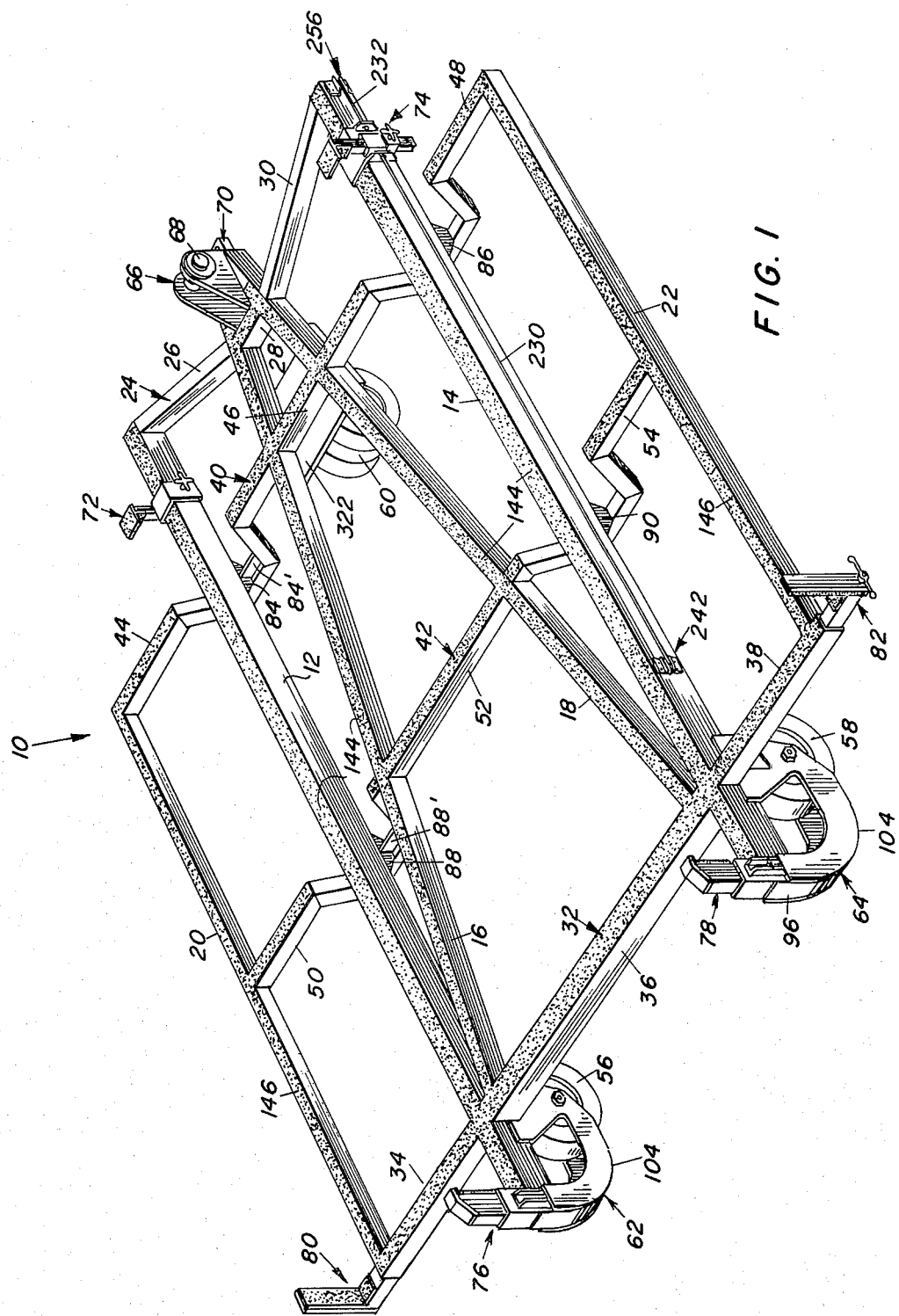
FIG. 1 is a perspective view of the glass plate transporter of the present invention.

Turning now to a consideration of the apparatus used in the present invention, reference is made to the perspective view in FIG. 1 and the top and side views in FIGS. 2 and 3 of a glass plate transporter 10. The transporter is comprised of a plurality of longitudinal and transverse frame members, the upper surfaces of which define a planar surface for receiving glass plates. In the illustrated embodiment, the longitudinal frame members include first and second main frame stringer elements 12 and 14, a pair of angled or generally diagonal stringer elements 16 and 18, and a pair of side rails 20 and 22. These longitudinal frame members are interconnected by a plurality of transverse frame members to form a strong, rigid frame assembly. The transverse members of the frame 34 include segments 26, 28 and 30 connected between the ends of stringers 12 and 16, 16 and 18, and 18 and 14 respectively; a rear cross piece 32 having segments 34, 36, and 38 connected between the ends of stringers 20 and 12, 12 and 14, and 14 and 22, respectively; and two intermediate transverse frame members 40 and 42. Member 40 includes segments 44, 46 and 48 connected between side rail 20 and angled stringer 16, stringers 16 and 18, and stringer 18 and side rail 22, respectively, while frame member 42 includes a first segment 50 extending between side rail 20 and diagonal stringer 16, a second segment 52 extending between the diagonals 16 and 18, and third segment 54 extending between diagonal 18 and side rail 22.

The transporter 10 is carried by a tricycle wheel arrangement which includes two rear wheels 56 and 58 mounted on fixed axles and a front wheel 60 which is mounted on a swivel caster to provide easy maneuverability of the device when it is being towed. The rear wheels 56 and 58 are mounted in wheel housings 62 and 64, respectively, with each housing including a pair of side plates, to be described, which provide a pivot for the transporter when it is lifted from the generally horizontal or loading position to a vertical unloading position.

At the forward end of the transporter 10 and secured to the two diagonal stringers 16 and 18 is a lifting yoke and towing assembly 66. This assembly, which is just forward of the swivel caster wheel 60, is provided with a pin 68 by means of which a crane hook or other hoist may be attached to the transporter for lifting it into the vertical position. A tongue 70 is provided for horizontal towing by suitable transporting equipment.

Mounted on the two main frame stringers 12 and 14 are a pair of pack finger guard assemblies 72 and 74, to be described in detail hereinbelow. These finger guard assemblies are vertically adjustable to accomodate various glass pack thicknesses, and are mounted for slidable motion longitudinally along the length of their corresponding stringers to accomodate various glass pack heights. The motion of the finger guard assemblies is controlled by cable and pulley arrangements so that they may be easily adjusted to abut the edge of the glass plate pack on the transporter and to secure it while the transporter is being moved. At the rearward end of the transporter, that is, at the end opposite the towing yoke 66, a pair of foot guard 76 and 78 are provided. These guards are preferably mounted at the ends of the main frame stringers 12 and 14, respectively, and are vertically adjustable to accomodate various thicknesses of the glass pack carried by the transporter. The foot guards serve as guides for aligning the glass plates as they are stacked on the transporter, and also serve to hold the bottom edge of the glass pack against the transporter while it is being lifted and carried in a vertical position. At opposite ends of the rear cross piece 32 are mounted a pair of adjustable side stops 80 and 82 which are moveable to accomodate various widths of glass plates, and which are used to secure the ends of the glass packs to prevent them from shifting during handling of the transporter. Also, one of the side stops may be used as an alignment guide during stacking of the glass plates to form the pack.

Turning now to a more detailed consideration of the frame construction, it will be seen that the upper surfaces of the longitudinal and transverse frame members define a substantially horizontal plane when the transporter is resting on its wheels in the loading position. These frame members are constructed of structural steel tubing with the upper surfaces being covered by felt or neoprene rubber pads, which protect the glass plates from damage by the steel tubing. This padding may be adhesively attached to the frame members, as well as to the finger guard assemblies, foot guards and side stops, by means of a suitable adhesive. This padding is not fully illustrated in all of the figures, in order to clarify the view of the structural members, but is illustrated in part in the more detailed drawings described hereinafter. The various portions of the support frame are interconnected and secured by welding or by other suitable means to provide a strong, rigid frame that is capable of supporting very heavy packs of glass. In a preferred embodiment of the invention, the transporter itself has a weight of approximately 1,650 pounds and was capable of carrying glass packs weighing 6,500 pounds.

The longitudinal main frame stringers 12 and 14 extend the full length of the transporter and provide a major portion of the support for the glass plates when the transporter is in the horizontal position. These frame members are generally rectangular in cross section and are connected at their forward ends to the forward ends of the angled stringers 16 and 18 by means of crosspiece segments 26 and 30, which are secured to the angled stringers in the area of the lifting yoke assembly 66. The spaced, generally parallel stringers 12 and 14 are interconnected at their lower, or rearward, end by the crosspiece segment 36, so that the main frame stringers and the front and rear crosspieces form a generally rectangular supporting frame. Located within this rectangular frame are the diagonal stringers 16 and 18 which are connected at their rearward ends to crosspiece segment 36 near the junction of this segment with the main frame stringers 12 and 14. The forward ends of the diagonal stringers 16 and 18 are connected to the segments 26 and 30 of the front crosspiece 24 and are separated by the front crosspiece segment 28 to provide a space between the ends of stringers which will receive the lifting yoke and towing assembly 66. This assembly is welded between the forward ends of stringers 16 and 18 and to the crosspiece 28, with the yoke assembly extending above the plane of the transporter frame to receive a lifting yoke pin 68. The lifting pin is thus positioned above the transporter surface plane, so that when the loaded transporter is hoisted to the unloading position, it will hang in a substantially vertical plane.

The space between diagonal stringers 16 and 18 is spanned at two points by the segments 46 and 52 of the intermediate transverse frame members 40 and 42, the stringers and the spacing segments forming an A-frame assembly within the rectangular frame defined by main frame stringers 12 and 14. The forward, or closed, end of the A-frame is secured to the lifting yoke assembly, while the rearward, or open, end of the A-frame is secured to crosspiece 32. This A-frame structure and the feet 76 and 78 provide the main support for the glass pack when the transporter has been lifted to a vertical position for carrying the pack to a storage frame or the like.

The side rails 20 and 22 are spaced outwardly from and are generally parallel to the main frame stringers 12 and 14 respectively. The side rails are interconnected by the intermediate transverse frame members 40 and 42 and by the rear crosspiece 32, thereby forming a second generally rectangular glass supporting surface. Since the side rails do not carry a major portion of the weight of the glass packs, they may be of smaller dimensions than the main frame members, but like all of the frame members, preferably are of steel tubing having a rectangular cross section.

The transverse frame members 40 and 42 not only provide a part of the glass supporting surface for the transporter 10, but also support the main frame stringers 12 and 14 and the side rails 20 and 22 by tying them to the A-frame structure. Thus, segment 44 of the forward transverse frame member 40 is secured at its inner end to stringer 16 and at its outer end to side rail 20, with the central portion of segment 44 being shaped to define a channel through which the main frame stringer 12 passes, the segment 44 passing under the stringer. A trapezoidal support plate 84 is welded between segment 44 and the lower surface of stringer 12 to form a rigid structural arrangement, the plate extending in a longitudinal direction. This plate is supported by a perpendicular support plate 84' welded to the upper surface of segment 44. In similar manner, segment 48 extends between stringer 18 and side rail 22, forming a channel which receives main frame member 14, the bottom of the channel portion of segment 48 being joined to main frame stringer 14 by means of a trapezoidal support plate 86. It will be noted that the swivel wheel 60 is secured to the central segment 46 of the transverse frame member 40, thereby providing a support for the outer portions of member 40. The use of longitudinally extending support plates 84 and 86 to provide the connection between transverse frame member 40 and the longitudinal main frame stringers 12 and 14 enables the finger guard assemblies 72 and 74 to be mounted on the outside of stringers 12 and 14 for motion along their full lengths. To this end, the finger guard assemblies are formed with a slot or channel (see FIG. 6) through which support plates 84 and 86 pass as the assemblies are moved longitudinally.

Transverse frame member 42 is secured between the side rails 20 and 22 at approximately their midpoints. Segment 50 of the transverse frame member 42 is secured at its inner end to stringer 16 and at its outer end to side rail 20, with the segment again having a channel-shaped portion which passes under the main frame stringer 12. Support plates 88 and 88' secure element 12 to segment 50 while allowing longitudinal motion of the finger assembly 72. Segment 54 of transverse frame member 42 similarly has its inner end connected to longitudinal frame member 18 and its outer end connected to side rail 22, the segment forming a channel portion which passes under the main frame stringer 14 and is secured thereto by a support plates 90, which is arranged to permit passage of assembly 74.

Figure 4:
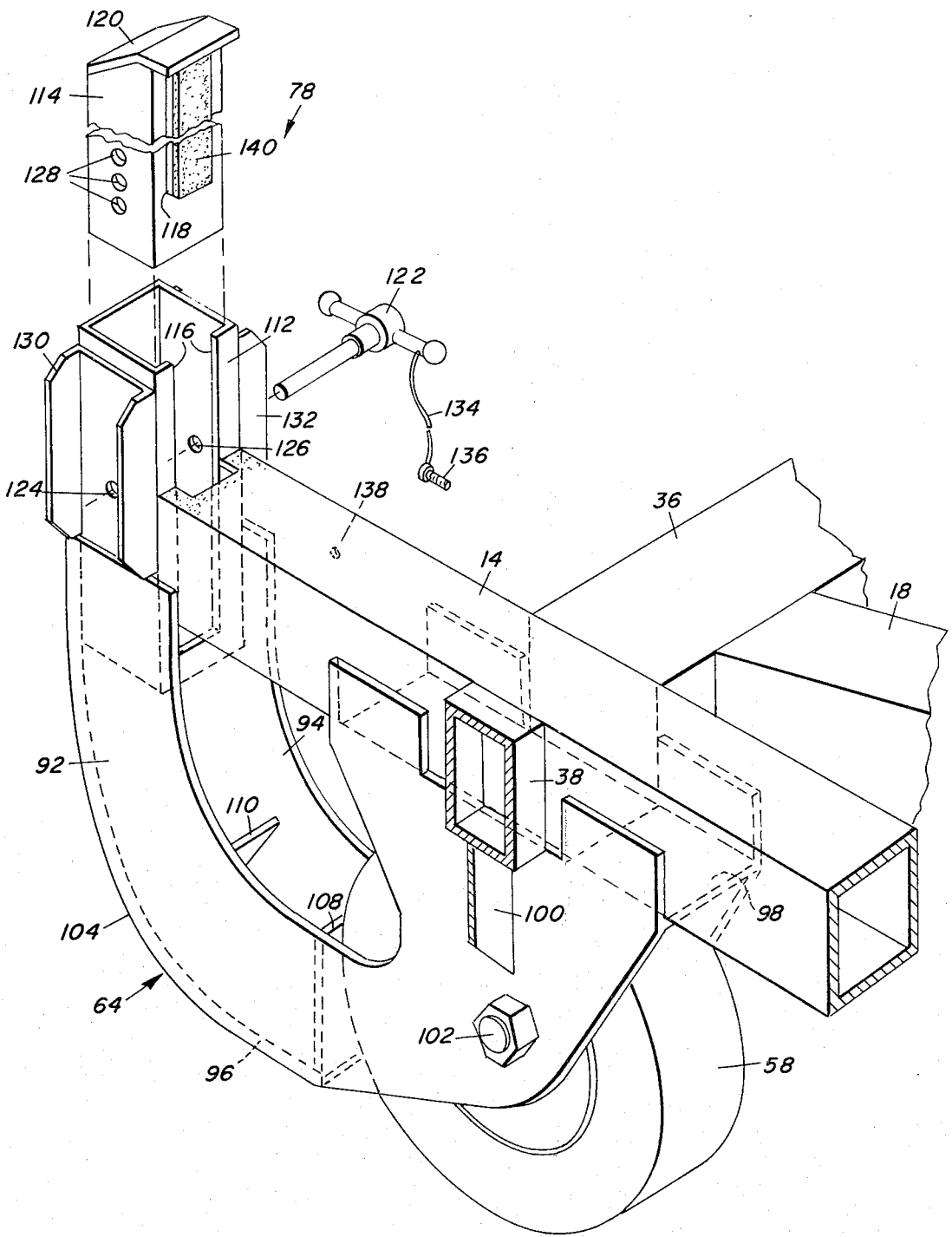
FIG. 4 is a partially exploded view of the pivot wheel housing and foot guard of the transporter.

As illustrated in the side view of FIG. 3 and the perspective view of FIG. 4, the rear wheels of the transporter 10 are secured to the longitudinal main frame stringers 12 and 14 by means of suitable housings 62 and 64. For purposes of illustration, the housing 64 is shown in a partially exploded view in FIG. 4 and in a side elevation in FIG. 3. The housing consists of a pair of parallel side plates 92 and 94, held in spaced relation by a curved bottom spacer 96, shown in phantom, and a top spacer 98, which cooperates with the upper edges of the plates to form a channel that is adapted to receive and to be welded to the opposite sides of stringer 14. The side plates are notched at the upper forward edges to receive the transverse frame segments 36 and 38, and a brace plate 100 is welded between the housing plate 92 and the frame segment 38 to provide additional strength. The rear wheel 58 is mounted on an axle 102 which passes through and is secured to the side plates 92 and 94, whereby the wheel is firmly secured to the transporter frame.

To the rear of wheel 58 the side plates 92 and 94 are formed with curved lower edges which serve as pivots when the transporter is lifted to its vertical position. Thus, for example, the lower edge 104 of the side plate 92 forms a curve that is approximately horizontal at a point adjacent wheel 58 and curves smoothly around to the vertical at the rear of the transporter. Preferably, the lower edge 104 is sufficiently close to the ground when the transporter is in the horizontal position that it will come into contact with the floor to support the weight of the transporter when the front end is lifted through an angle of approximately 12° with the floor. The side plates may be formed from a solid piece of plate steel, or may be formed with a cutout 106 in the manner illustrated (shown better in FIG. 3), as desired. In order to provide additional structural rigidity to the wheel housing, a pair of braces 108 and 110 may be welded between plates 92 and 94.

The rear of with reference to FIG. 4, the wheel housing 64 is welded to the end of stringer 14, as illustrated, but also extends beyond the end of the frame stringer to define a channel which is adapted to receive the foot guard 78, which is typical of the 2 foot guard assemblies provided on the present transporter. This foot guard consists of a piece of tubing 112, which forms a housing for an adjustable foot piece 114. Housing 112 is generally rectangular in cross section and is designed to receive in telescoping manner the vertical foot piece 114. A slot 116 is provided in the forward side of the vertically disposed housing and is adapted to receive a corresponding guide plate 118, which is secured to the front surface of foot piece 114. The guide plate fits into and engages the sides of slot 116, thereby holding the foot piece in substantial vertical alignment with housing 112, even when the foot piece is extended out of the housing. Foot piece 114 is freely moveable within housing 112, and carries at its top a forwardly extending flange 120 which is adapted to engage the upper surface of any glass plates being carried by the transporter (see FIG. 3). The foot piece may be raised during loading of the glass plates and then lowered until the flange 120 contacts the upper surface of the glass. A quick release pin 122 is provided to secure the foot piece in a selected vertical position, the pin passing through apertures 124 and 126 in the sidewalls of housing 112 and through a selected one of the corresponding holes 128 in the foot piece. Preferably a pair of generally U-shaped channels 130 and 132 are welded to the sides of housing 112 in order to protect the ends of pin 122, so that it cannot be accidentally displaced while the transporter is being moved. Pin 122 may be secured to the side of stringer 14 by means of a cord 134 and a screw 136 adapted to be threaded into an aperture 138 in the sidewall of the stringer, so that the pin will not become separated from the transporter and lost. It will be noted that housing 112 may be welded or otherwise secured both to the side plates 92 and 94 and to the end of stringer 14, thereby forming a strong and secure support for glass packs carried by the transporter. It will be understood that the foot guard assembly 76 is substantially identical to the assembly 78 illustrated in FIG. 4.

As illustrated in FIG. 4, the face of the guide plate 118 preferably is covered by a suitable cushioning material 140, such as felt or neoprene rubber. Similarly, the front surface of housing 112 and the abutting front surfaces of channels 130 and 132 may be similarly covered by a cushioning pad 142 (see FIG. 3), so that when the transporter is hoisted to a vertical position, the edges of the glass plates thereon will be protected against contact with the metal structural members. Similarly, the upper surface of stringer 14 may be provided with a cushioning pad 144 and the upper surface of side rail 22 may be provided with a cushioning pad 146 (see FIG. 1).

Figure 5:
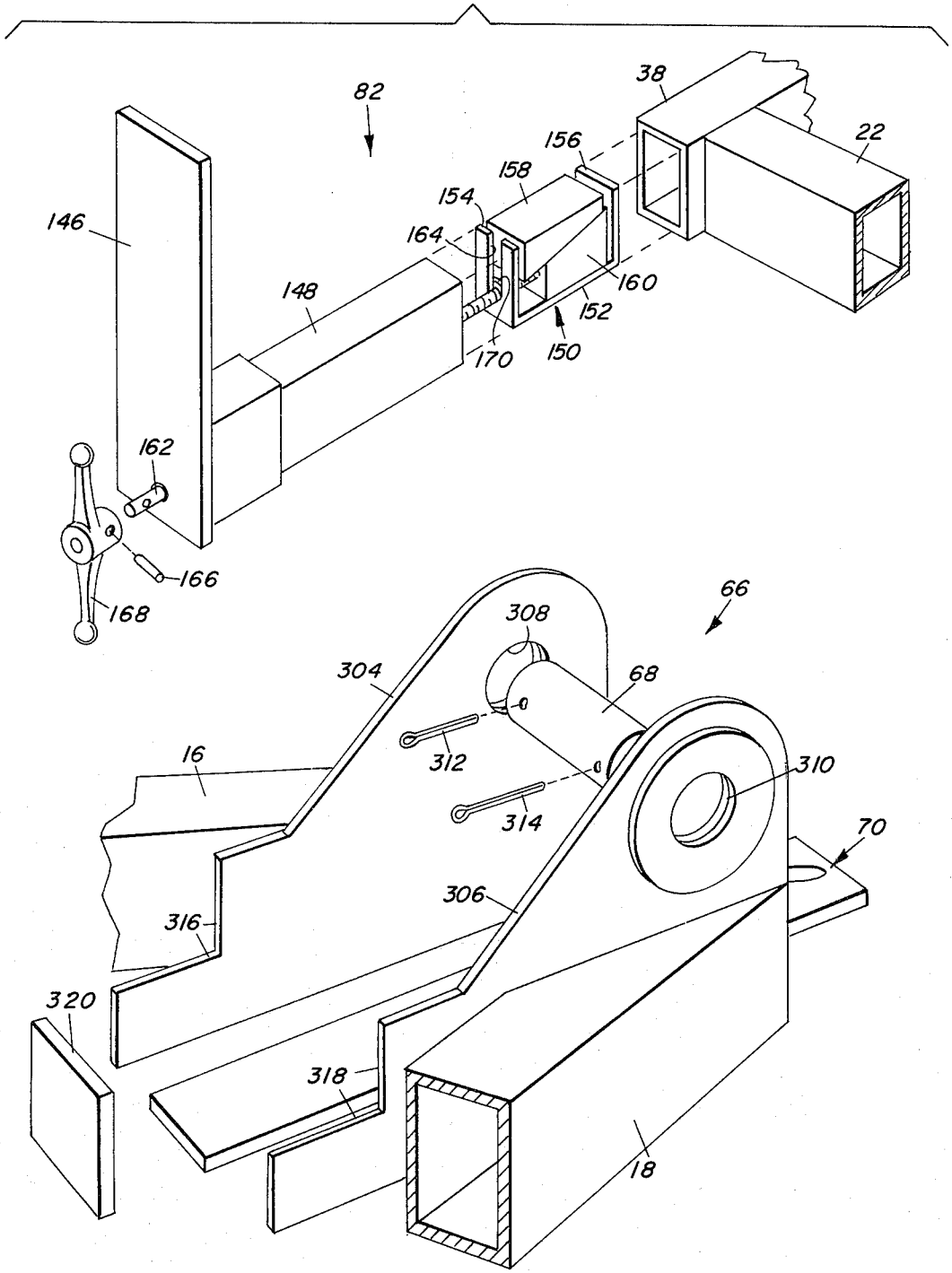
FIG. 5 is an exploded view in perspective of the adjustabove side guard of the transporter.

The structure of the side guard stops 80 and 82 is illustrated in FIGS. 2, 3, and 5, FIG. 5 being an exploded view of assembly 82. The side guard assembly comprises a vertical guard plate 146 secured to a tubular support bar 148 which is adapted to be telescoped into the open end of segment 38 of the rear crosspiece 32. Fastened to the inner end of support bar 148 is a locking assembly 150 which is adapted to slide freely within the tubular frame segment 38 for lateral adjustment of the guard plate 146, the lock being expandable to secure the stop assembly in a selected position. The locking assembly comprises a U-shaped locking frame 152 having a front wall 154 and a rear wall 156 between which are carried a pair of complementary locking blocks 158 and 160. The lower surface of block 158 and the upper surface of block 160 are in sliding contact with each other, with both surfaces sloping upwardly from the front wall toward the rear wall of the locking frame. A locking shift 162 is threaded into the lower block 160, passes through the hollow support bar 148 and through an aperture in the guard plate 146, where it is secured, as by means of a pin 166, to a lock handle 168. Shaft 162 is freely rotatable in slot 164 and in guard plate 146 whereby rotation of the shaft by means of the locking handle will cause block 160 to be threaded onto or off of the shaft and thus to move forward or backward in locking frame 152. Motion of block 160 toward the front wall 154 will force the locking block 158 upwardly out of the frame, since this block is restrained from forward and backward motion by the front and rear walls. When the locking assembly is inserted into the tubular segment 38, rotation of the locking shaft 162 will wedge the locking block against the inner wall of segment 38, thereby locking the guard plate in a desired position. A washer 170 is secured to shaft 162 inside of the front wall of the locking frame 162, with the washer and the handle 168 securing opposite ends of the shaft and holding the lock 150 in assembled relationship with the support bar end plate. By rotating the threaded shaft in a direction to move block 160 toward rear wall 156, the dimensions of the locking assembly are reduced, so that this assembly and the support bar 148 may be telescoped into or out of the tubular frame segment 38, whereby the position of guard plate 146 can be set. Thereafter, the threaded shaft 162 is rotated in the opposite direction to force the locking block 158 upwardly to secure the guard. The side stop 80, similarly constructed, operates in the same manner.

The specific construction of the pack finger guard assemblies 72 and 74 is illustrated in FIGS. 6, 7A, 7B and 8, with partial, exploded, and top plan views of the finger guard assembly 74. This assembly is comprised of two main components, a longitudinally adjustable split collar 172 and a vertically adjustable finger guard, or clamp, 174, carried by the collar. The collar is shaped to fit over the main frame stringer 14 and thus in this embodiment is generally rectangular in cross section, the interior dimensions of the collar being sufficiently larger than the outer dimensions of stringer 14, to permit easy movement of the collar along the stringer. A slot 176 is formed in the bottom wall 178 of collar 172 to allow the collar to move the full length of the stringer, the support plates 86 and 90 (see FIG. 1) that are welded to the bottom surface of the stringer passing through slot 176 as the collar is moved.

Secured to the sidewall 180 of the collar is an internally threaded sleeve 182 which meets with an aperture 184 in the sidewall. A threaded locking bolt 186 is adapted to fit into sleeve 182, with the end of the bolt passing through aperture 184 and into contact with the corresponding sidewall of the main frame stringer 14, whereby the collar 180 may be locked into a selected longitudinal position by tightening the locking bolt.

Figure 6:
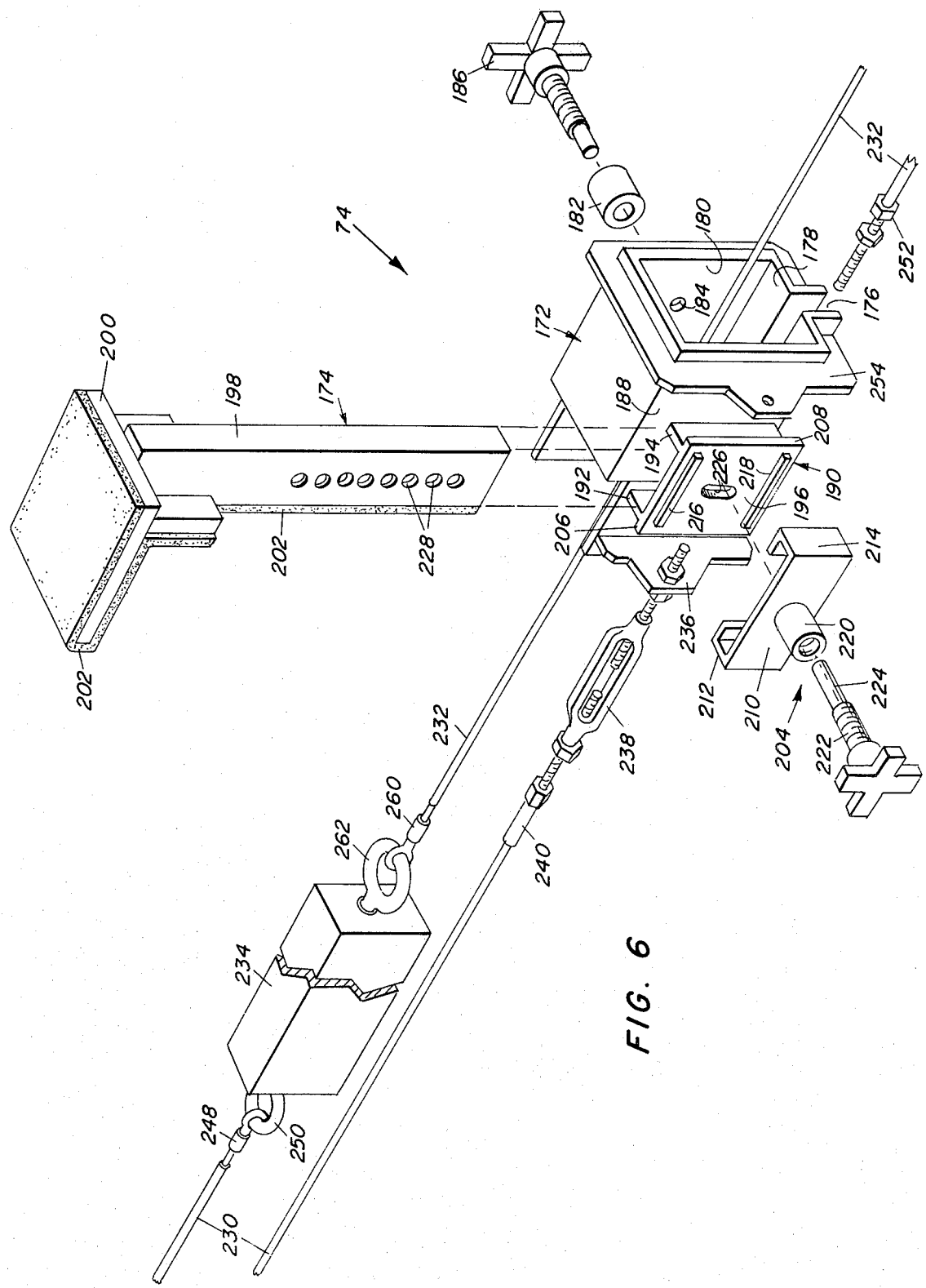
FIG. 6 is an exploded view of the finger guard assembly of the transporter.

Secured to the sidewall 188 of the collar 172 is a generally U-shaped channel member 190 which acts as a receptacle for the vertical finger guard 174. Channel member 190 is formed by a pair of spaced legs 192 and 194, which are welded to the sidewall 188 of the collar, and a wall 196. The finger guard is comprised of a vertical support arm 198 to which is secured a horizontal guard plate 200. Support arm 198 is slidable in and adjustable with respect to the channel defined by legs 192 and 194 and wall 196, whereby the height of guard plate 200 may be adjusted with respect to the top surface of main frame stringer 14. As shown in FIG. 6, the guard plate is generally L-shaped in configuration, with one leg of the plate being generally parallel to the rearwardly facing surface of support arm 198 (to the left as viewed in FIG. 6), and the other leg being perpendicular to the support arm. Since it is the rear surface of support arm 198 and the lower surface of guard plate 200 that come into contact with glass plates stored on the transporter 10, these surfaces are provided with a suitable protective padding 202, which as noted above, may be of felt, neoprene rubber, or the like.

Vertical adjustability of the finger guard plate 174 is provided by a clamp 204, which is adapted to fit over a pair of shoulders 206 and 208 on channel member 190. The clamp 204 comprises a body portion 210, which is generally C-shaped, having legs 212 and 214 adapted to extend around shoulders 206 and 208, respectively, whereby the clamp is vertically slidable along wall 196 of channel member 190. A pair of stops 216 and 218 on wall 196 limit the motion of clamp 204. An internally threaded sleeve 220 is secured to clamp 204 in alignment with an aperture in the body 210, the sleeve being adapted to receive a locking bolt 222, which tapers into an elongated locking pin 224. The pin portion 224 of the locking bolt is adapted to extend through clamp 204, through an elongated aperture 226 in the wall 196 of channel member 190 and thus into engagement with a selected one of a plurality of pin receiving holes 228 formed in the vertical arm 198 of the vertically adjustable finger guard.

As illustrated in FIG. 7B, when the clamp 204 is assembled to the channel member 190, the locking bolt may be threaded into sleeve 220, so that the locking pin extends through one of the apertures 228 to secure the finger guard at the desired height. The elongated aperture 226 permits additional adjustability of the height of the finger guard. When the locking bolt 222 is tightened against wall 196, clamp 204 is pulled outwardly so that the legs 212 and 214 grip the corresponding shoulders 206 and 208 to hold the clamp, and thus the finger guard, in the desired vertical position.

Figure 7A:
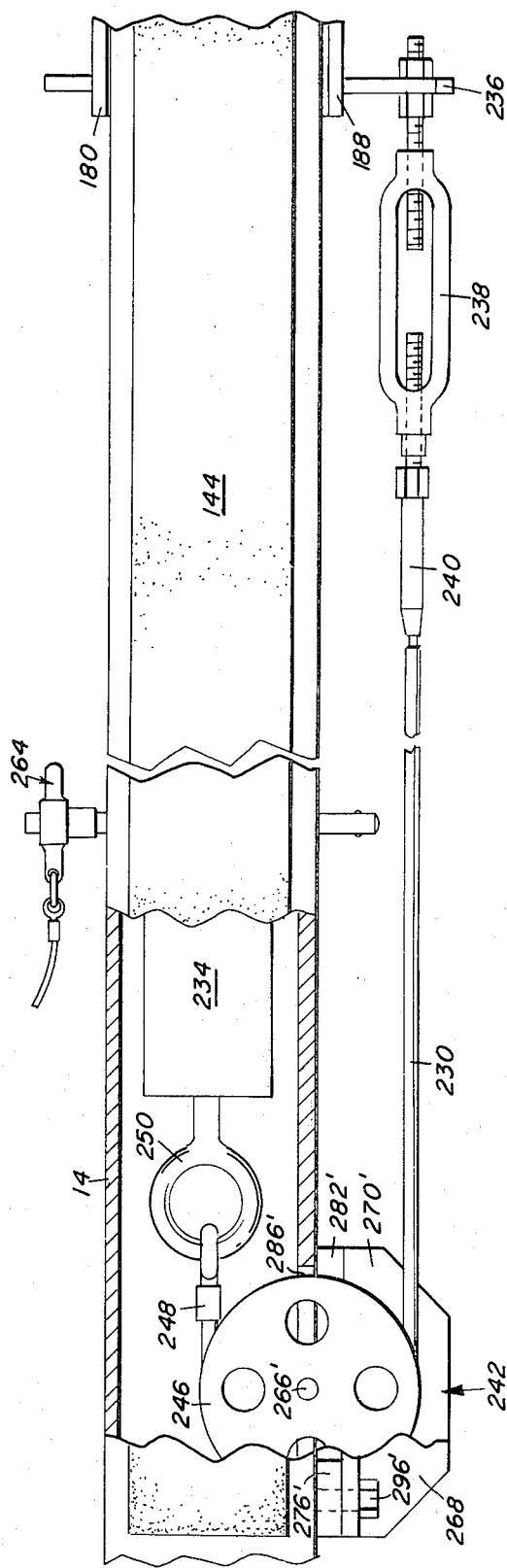

With reference to FIG. 7A and 7B, movement of collar 172 along stringer 14 is accomplished by means of a pair of cables 230 and 232, each of which is connected at one end to the collar and at its opposite end to a sliding weight or counterbalance 234, located within the tubular frame stringer 14 and designed to regulate the motion of the finger guard assembly. Cable 230 is secured to the collar by means of a flange 236 on sidewall 188, a turnbuckle 238, and a cable clamp 240. Cable 230 extends from the collar along the outside of stringer 14 to a pulley assembly 242 secured to the sidewall 244 of the stringer. The cable passes around pulley wheel 246 of the rear pulley assembly, passes up the interior of the stringer and is secured to the weight 234 as by means of a cable clamp 248 and a ring 250 secured to the end of the weight.

With specific reference to FIG. 7B, in similar manner, cable 232 is secured by means of a cable clamp 252 to a flange 254 formed on or secured to the forward edge of collar 172. The cable extends from the flange forwardly along the outside of stringer 14 to a forward pulley assembly 256, where it passes around pulley wheel 258 to the interior of tubular stringer 14. The cable then passes rearwardly through the stringer, through the center of collar 172, to the counterbalancing weight 234, to which it is secured by means of a cable clamp 260 and suitable ring 262 secured to the weight (see FIG. 6). When the locking bolt 186 is loose, the collar 172 accordingly may easily be moved forwardly or rearwardly along stringer 14 by grasping and pulling that portion of cable 230 or 232 which is exposed on the exterior of stringer 14. The turnbuckle 238 insures that the cable is sufficiently taut to permit easy and accurate positioning of the collar. The counterbalance 234 matches the weight of the collar assembly, and prevents the collar from sliding along the stringer under its own weight when the transporter 10 is raised to a vertical position.

With reference to FIG. 7A, in order to permit the collar to be locked in its forwardmost position, a lock pin 264 is provided. This pin may be inserted through a pair of apertures formed in the sidewalls of stringer 14 at a location slightly forward of the location of counterweight 234 when collar 172 is in its forwardmost position. When this pin is passed through the stringer, it prevents the counterweight from moving forward within the stringer and thus effectively locks the collar in a forward position. This arrangement is particularly useful when the transporter is in a vertical position and the glass plates carried by it are to be transferred to a storage rack. At this time, the finger guards must be raised out of contact with the glass; the lock pin 264 is used to hold the finger guard out of the way. When not in use, the lock pin may be stored in a convenient aperture on an adjacent stringer.

FIG. 8 illustrates an exploded view of a typical pulley assembly; in this figure a forward pulley 256 is shown. The pulley assembly 256 consists of the pulley wheel 258 mounted on a shaft 266 which is in turn mounted for rotation in a pair of pulley blocks, or brackets, 268 and 270. The brackets are generally L-shaped, each having one vertical leg adapted to abut the sidewall of stringer 14 and a perpendicular leg extending over the pulley wheel to provide a pulley housing. Secured to the vertical leg of each pulley bracket is a bearing block, block 272 being secured to the upper pulley bracket 268 and bearing block 274 being attached to the lower pulley bracket 270. These bearing blocks are adapted to receive the ends of the pulley shaft to rotatably mount the pulley wheel.

Welded or otherwise secured to the sidewall of stringer 14 are a plurality of spacer blocks 276, 278, 280, and 282 which are spaced around a generally cross-shaped opening 283 in the side of the stringer wall. The opening has a pair of horizontal arms 284 and 286 intersecting a pair of vertical arms 288 and 290, the horizontal arms 284 accomodating the pulley wheel 258, and the vertical arms 288 and 290 accomodating the bearing blocks 272 and 274 when the assembly 256 is secured to the stringer. A pair of apertures 292 and 294 are formed in the vertical leg of pulley bracket 268 and are aligned with spacer blocks 276 and 278. The spacer blocks are internally threaded to receive bolts or screws 296 or 298 (FIG. 7B) by means of which the bracket is secured to the stringer. In similar manner, pulley bracket 270 incorporates a pair of apertures 300 and 302 which are aligned with the internally threaded spacer blocks 280 and 282 and adapted to receive corresponding bolts to secure this bracket to the stringer.

When assembly 256 is in place, pulley wheel 258 is mounted with its shaft aligned with the sidewall of the stringer, so that the pulley wheel extends halfway in and halfway out of the tube, as may be seen in FIG. 7B. It will be noted that the pulley assembly 242 (FIG. 7A) is identical to assembly 256 and accordingly similar items carry similar numbers, with the elements of assembly 242 being primed. Again, similar pulley assemblies are provided on the main frame stringer 12 to facilitate longitudinal movement of finger guard assembly 72.

The lifting yoke and towing tongue assembly 66 is illustrated in detail in FIG. 9, which is an exploded view of this assembly. A pair of side pieces 304 and 306, are adapted to be welded to the front ends of diagonal stringers 16 and 18, respectively. Apertures 308 and 310 are formed in the upper portion of the side pieces to receive opposite ends of the lifting pin 68, which may be secured in the apertures by suitable means such as cotter pins 312 and 314. The rearward portion of the side pieces are notched or stepped at 316 and 318 respectively to receive the front crosspiece segment 28 (FIG. 1). Welded to the lower edges of the side pieces 304 and 306 and extending forwardly out from between these side pieces is the tow bar 70 which is adapted to be secured to a conventional hitch arrangement on a towing vehicle. A rear plate 320 is welded to the rear edges of the tow bar and side pieces to increase the strength of the structure. By securing the lifting yoke assembly to the diagonal stringers 16 and 18 as well as to the front crosspiece, as illustrated in FIG. 1, the towing and lifting assembly is provided with sufficient strength to enable it to lift and pull the required loads.

With reference to FIGS. 1 and 3, secured to the frame members slightly to the rear of the yoke assembly is the swivel wheel assembly 60, which is of conventional construction and includes an upper support plate 322 welded to the undersurfaces of the frame segment 46 and diagonal stringers 16 and 18. Pivotally connected to the undersurface of support plate 322 by means of a suitable axle or bearing arrangement is a pivot plate 324. A wheel housing 326 is secured to the pivot plate and supports at its lower end an axle 328 which carries the forward wheel 60.

The wheel housing 326 is canted toward the rear so that axle 328 is located behind the vertical axis about which plate 324 pivots, whereby the wheel assembly acts as a caster to permit easy steering of the transporter.

Figure 10:
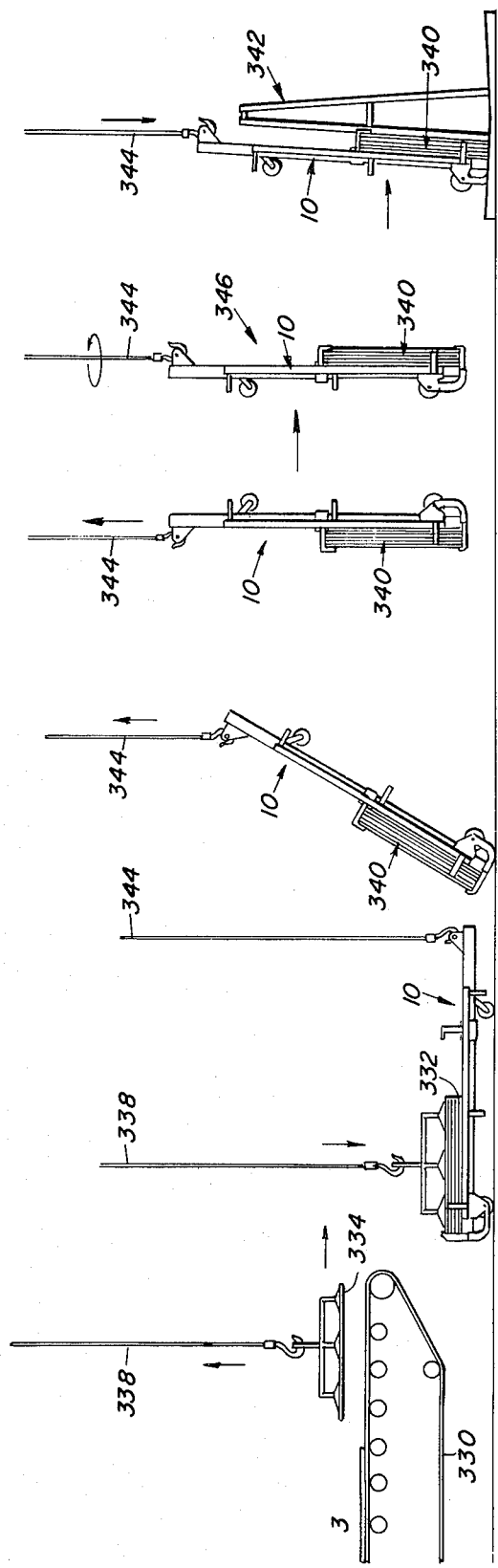
FIG. 10 is a diagramatic illustration of the manner in which the transporter of FIG. 1 is utilized in the method of the present invention.

As illustrated in FIG. 10 the transporter 10 is adapted to be placed adjacent the end of glass plate producing line which may include a conventional conveyor 330 leading from a cutting station. Pieces of glass such as those illustrated at 332, 334, and 336 are advanced along the conveyor to an unloading station at the end of the line, where a vacuum lifter 338 is used to pick up the glass plates and deposit them on the upper surface of the transporter when it is in its horizontal position. To assure proper location of the glass, one of the side stops 80 or 82 is positioned to act as a guide so that the plates will be positioned in the center of the transporter. The foot guards 76 and 78 are raised sufficiently high to accomodate a stack of the glass plates, and act as a rear stop so that the plates will be properly aligned as they are stacked on the transporter. As illustrated in FIG. 3, a stack 340 of glass plates may be positioned on the transporter, the exact number of plates in a stack depending on the dimensions of the particular plates. Thus, for very large plates the transporter will support a pack having a thickness of about 3 inches, whereas smaller plates may be stacked as high as 8 inches before reaching the weight limit of the transporter. Upon completion of the stacking operation, the remaining side stop is telescoped into the rear cross piece and locked into position to hold the stack against transverse shifting. The foot guard 78 is then adjusted so that the foot piece 114 is telescoped into its housing 112, bringing the flange 120 into contact or near contact with the upper surface of the stack. The quick release pin 122 is then located in the appropriate one of the holes 128 (see FIG. 4) to prevent undue motion of the glass during subsequent handling of the transporter. In similar manner, the foot guard 76 is adjusted and locked into position. The finger guard assembly 74 is then moved rearwardly along stringer 14 until the vertical support arm 198 contacts the edge of the stack. Locking bolt 186 is then tightened to hold the assembly in place and the vertical support arm is lowered until guard plate 200 contacts or approximately contacts the upper surface of the stack. Locking bolt 222 is then tightened so that locking pin 224 engages one of the apertures 228 in the support arm 198 (see FIG. 6). In similar manner, finger guard assembly 72 is adjusted on stringer 12 until it contacts and secures the forward edge of the glass pack. The glass pack transporter may then be towed by a suitable vehicle to a wareroom where the glass pack is to be stored on a storage frame such as that illustrated at 342 in FIG. 10.

Since the glass must be stored in a vertical rather than horizontal position, the transporter must next be lifted to a vertical position. This is accomplished by connecting a suitable hoist 344 to the lifting pin 68. The locking bolt 186 on each of the finger guards 72 and 74 is then released, and the yoke end of the transporter lifted by the hoist. As the transporter is lifted, the weight is transferred from the wheels to the rear wheel housings 62 and 64. This occurs when the transporter reaches an angle of about 12° with the floor. Thereafter, the transporter pivots on the lower pivot edges 104 the housings until the transporter reaches a substantially vertical position and is lifted off the floor. As illustrated at 346 in FIG. 10, the transporter is then advanced to the storage rack 342, with the glass pack facing the rack, and the side stops 80 and 82 are unlocked and released to minimize strain on the sides of the pack. The transporter is lowered until the bottom edge of the pack rests on the storage frame, and, since the finger guard assemblies have previously been loosened, the transporter can be lowered until the foot assemblies 76 and 78 are free of the lower edge of the glass. By grasping the cables 230 or 232 the finger guard 74 may be lifted free of the top edge of the pack and held in that upper position by insertion of pin 264. In similar manner guard 72 is lifted free of the top edge, and the transporter is moved away from the pack, which remains on the storage frame.

Figure 11:
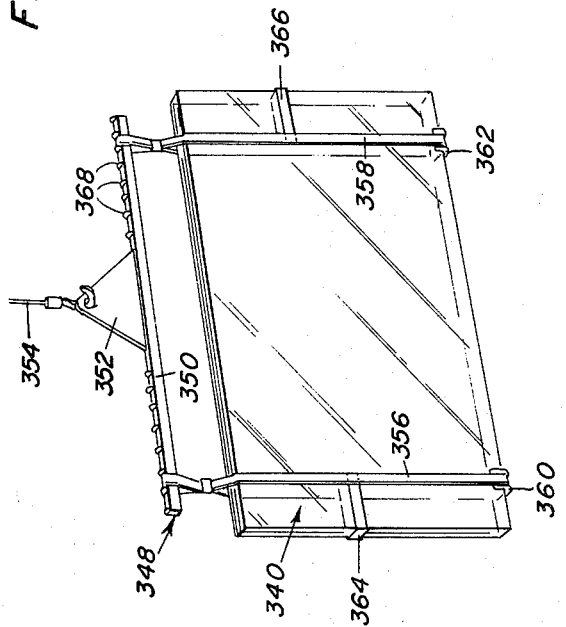
FIG. 11 illustrates the sling assembly used in handling packs of loose glass plates.

To remove the glass pack from the storage frame, the sling assembly 348 illustrated in FIG. 11 is provided. This assembly comprises a spreader bar 350 having a carrying yoke 352 adapted to be supported by a suitable hoist 354. A pair of slings 356 and 358 made from a material such as polyester webbing are adapted to be looped over the spreader bar at their upper ends and looped under the glass packs at their lower ends. The bottoms of slings 356 and 358 are provided with protective plates 360 and 362, respectively, made from a material such as steel to prevent the glass edges from cutting the sling material and coated with rubber to prevent slippage. At the midpoint of each sling is a horizontal strap, strap 364 being secured to sling 356 and strap 366 being secured to sling 358. These straps secure the edges of the glass pack 340, and prevent slippage.

The top edge of the spreader bar is provided with a plurality of spaced ridges or stops 368 which position the upper loops of the vertical straps 356 and 258 at spaced points corresponding to the width of the glass pack, and which prevent the straps from slipping off of the bar in the event of a slight unbalance of the pack. The sling assembly 348 permits the pack to be picked up from the storage frame 342 for transport out of the wareroom to a suitable vehicle such as a truck or railroad car for delivery to a customer.

Thus, it will be seen that an improved method and apparatus for handling glass plates has been provided by the present invention, enabling glass plates to be efficiently handled in loose packs without the need for expensive and time-consuming packaging operations. The apparatus includes a transporter which is adapted to receive glass plates from a source such as a cutting table or conveyor line, form the plates into a pack, transport the pack to a wareroom, and lift it into a vertical position for storage on a conventional storage rack. The pack so formed may then be removed from the wareroom by a spacer bar and sling assembly for delivery to a customer, again obviating the need for expensive handling and packaging techniques. Although the present invention has been described and illustrated in terms of a specific embodiment thereof, it will be apparent to those of skill in the art that various changes and modifications can be made in the invention without departing from the true spirit and scope thereof as described in the following claims.

What is claimed is:

1. A method for handling loose glass plates, comprising:

locating a portable transporter adjacent a glass plate producing line, the transporter being in its loading position;

stacking a plurality of glass plates on the portable transporter to form a glass pack;

securing the plates on the transporter with securing means to (1) prevent longitudinal and lateral movement of the glass plates relative to the transporter and (2) prevent movement of the glass plates away from the transporter when the transporter is being positioned in its unloading position;

moving the transporter to a glass storage area;

hoisting the transporter to an unloading position;

carrying the transporter to a position adjacent a glass pack storage frame;

positioning the glass pack on the storage frame;

releasing the glass pack; and removing the transporter, whereby the glass pack is stored on the storage frame in a vertical position.

2. The method as set forth in claim 1, further including the step of:

removing the loose glass pack from the storage frame for delivery.

3. The method as set forth in claim 2, wherein said step of removing the pack from the frame comprises:

positioning sling means on the pack;

mounting the sling means on a corresponding spreader bar; and hoisting the spreader bar and sling means for transporting the glass pack in a vertical position.

4. A method for handling loose glass plates, comprising:

locating a portable transporter having a receiving surface adjacent a glass plate producing line with the receiving surface in its loading position;

sequentially removing individual glass plates from the glass plate producing line;

positioning the individual glass plates onto the receiving surface to provide a glass pack;

engaging the glass pack by securing means mounted on the transporter (1) to prevent longitudinal and lateral movement of the individual glass plates relative to the receiving surface and (2) to prevent movement of the glass plates away from the receiving surface when the transporter is being positioned in its unload position; and moving the transporter to a glass storage area.

5. The method as set forth in claim 4 further including the steps of:

hoisting the transporter to the unload position;

carrying the transporter to a position adjacent a glass pack storage frame;

positioning the glass pack on the storage frame;

releasing the securing means to release the glass pack from the receiving surface of the transporter; and removing the transporter to store the pack of glass plates on the storage frame in a vertical position.

6. The method as set forth in claim 4 wherein the transporter further includes a guide means for aligning the individual glass sheets to be stacked on the receiving surface of the transporter in alignment with each other wherein said positioning step is accomplished by moving the individual glass plates removed from the glass plate production line onto the receiving surface into engagement with the guide means.

7. The method as set forth in claim 5 further including the step of removing the loose glass pack from the storage frame for delivery.

8. The method as set forth in claim 7 wherein said step of removing the pack from the frame comprises:

positioning sling means on the packs mounted on the frame to engage bottom portions and side portions of the pack to prevent longitudinal and lateral movement of the glass plates relative to one another and to lift the pack;

mounting the sling means on a spreader bar; and hoisting the spreader bar and sling means to maintain the glass sheets in the pack such that the individual loose glass plates are transported in a vertical position as a pack.

* * * * *